United States Patent [19]

Instance

[11] Patent Number: 4,888,078

[45] Date of Patent: Dec. 19, 1989

[54] LABELS AND MANUFACTURE THEREOF

[76] Inventor: David J. Instance, Guinea Hall, Sellindge, Kent, United Kingdom

[21] Appl. No.: 185,279

[22] Filed: Apr. 18, 1988

Related U.S. Application Data

[63] Continuation of Ser. No. 895,955, Aug. 13, 1986, abandoned.

[30] Foreign Application Priority Data

Aug. 14, 1985 [GB] United Kingdom ................. 8520417

[51] Int. Cl.[4] ............................................. B32B 31/00

[52] U.S. Cl. ..................................... 156/249; 156/269; 156/301; 156/302; 156/552

[58] Field of Search ................................ 156/247-249, 156/257, 268, 344, 299-303, 552, 264-265

[56] References Cited

U.S. PATENT DOCUMENTS

| | | | |
|---|---|---|---|
| 2,648,924 | 8/1953 | Brewster | 156/247 X |
| 2,862,846 | 12/1958 | Blackford | 156/249 |
| 3,245,855 | 4/1966 | Stenrall | 156/247 X |
| 3,505,140 | 4/1970 | Dunn | 156/249 |
| 4,594,125 | 6/1986 | Watson | 156/552 X |
| 4,690,720 | 9/1987 | Mack | 156/249 X |

*Primary Examiner*—David Simmons

*Attorney, Agent, or Firm*—Birch, Stewart Kolasch & Birch

[57] ABSTRACT.

The present invention relates to a method and system for producing a label comprising a folded sheet which is sealed between two webs, one of which is transparent. One of the webs is self-adhesive and is provided from pressure-sensitive stock which has had the release backing material removed. A succession of sheets are applied to the self-adhesive surface of the web and then the other web is laminated over the adhered sheets by being adhered to the exposed self-adhesive surface. The composite web is then cut into individual labels.

7 Claims, 1 Drawing Sheet

LABELS AND MANUFACTURE THEREOF

This application is a continuation of application Ser. No. 895,955 filed on Aug. 13, 1986, now abandoned.

BACKGROUND TO THE INVENTION

The present invention relates to a method and apparatus for producing labels.

SUMMARY OF THE INVENTION

An object of the present invention is to provide a label which can be manufactured quickly and inexpensively and which is protected against soiling or damage prior to use.

Accordingly, the present invention provides a method of producing labels comprising the steps of:

(a) providing a length of pressure-sensitive stock comprising a web of self-adhesive material which is carried on a release backing material;

(b) removing the release backing material from the web of self-adhesive material;

(c) applying a succession of individual articles along the length of the self-adhesive surface of the web of self-adhesive material, (d) applying a web of laminate material to the self-adhesive surface so as to cover the succession of articles adhered thereto; and (e) cutting through the adhered webs at a succession of locations along the length of the webs so as to form a plurality of individual labels, each of which includes a respective article which is sealed between the two webs.

The present invention further provides a system for producing labels comprising means for mounting a reel of pressure sensitive stock comprising a web of self-adhesive material which is carried on a release backing material, means for removing the release backing material from the web of self-adhesive material, means for applying a succession of individual articles along the length of the self-adhesive surface of the web of self-adhesive material, means for applying a web of laminate material to the self-adhesive surface so as to cover the succession of articles adhered thereto and a cutting device for cutting through the adhered webs at a succession of locations along the length of the webs so as to form a plurality of individual labels, each of which include a respective article which is sealed between the two webs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
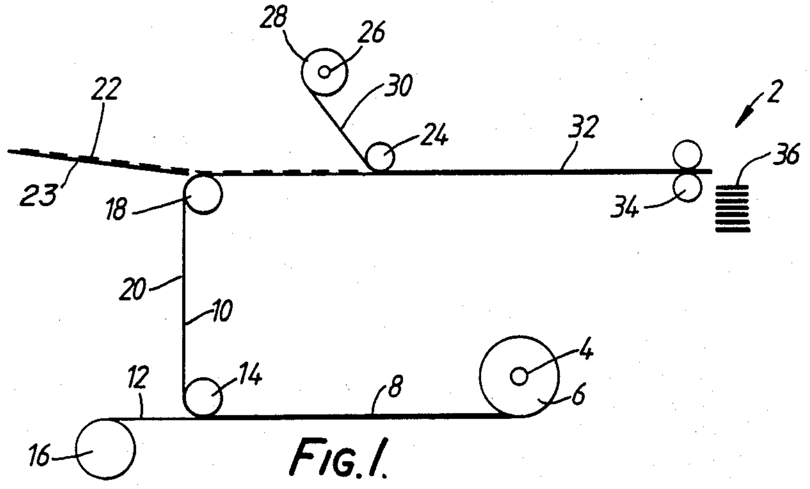
FIG. 1 shows schematically a system for producing the sealed labels in accordance with the present invention.

Referring to the drawings, a system 2 for producing sealed labels comprises a shaft 4 on which a reel 6 of pressure-sensitive stock 8 is mounted. The pressure-sensitive stock 8 consists of a web of paper 10 which is coated on one side with a pressure-sensitive adhesive so as to make that one side of the paper 10 self-adhesive. The self-adhesive surface is covered by a web of release backing material 12, such as waxed paper. The pressure-sensitive stock 8 is fed out from the reel 6 to a roller 14. At the roller 14, the web of paper 10 is separated from the release material 12 by turning the web of paper through 90° about the roller 14. The release-backing material 12 is collected on a reel 16.

The web of paper 10 is fed to a folded sheet applying station including a second roller 18 at which the web of paper 10 is again turned through 90° so as to be conveyed substantially horizontally with the exposed self-adhesive surface 20 uppermost. The two rollers 14 and 18 contact only the non-self-adhesive surface of the web of paper 10.

At the second roller 18, a plurality of folded sheets 22 are fed in succession by an appropriate conveying mechanism 23 onto the self-adhesive surface 20 of the web of paper 10. Suitable sheet conveying mechanisms are known in the art. The folded sheets 22 are spaced from each other in a row along the length of the web of paper 10.

The folded sheets 22 may be, for example, a folded printed sheet of instructions. The rear, or bottom, surface of each of the folded sheets 22 is adhered to the web of paper 10 by the self-adhesive surface 20 of the web of paper 10.

The web of paper 10 with the succession of folded sheets 22 adhered thereto is then conveyed to a laminate web applying station including a pressure roller 24. A shaft 26 has mounted thereon a reel 28 of a web of laminate material 30. The web of laminate material 30 is preferably composed of transparent polyester or acetate. Alternatively, the web of laminate material 30 may be pre-printed and, if desired, opaque.

The web of laminate material 30 is fed out from the reel 28 and is pressed by pressure roller 24 against the upper surface of the folded sheets 22 and the exposed self-adhesive surface 20 of the web of paper 10. The web of laminate material 30 is thereby adhered to the web of paper 10 and covers the folded sheets 22.

The composite web 32 is then conveyed to a die-cutting station which comprises a pair of die-cutting rollers 34. The die-cutting rollers 34 cut the composite web 32 into a succession of sealed labels 36, each label 36 including a respective folded sheet 22. The labels 36 are collected in any convenient manner.

In operation, the reel 6 of pressure-sensitive stock and the reel 28 of laminate material are unwound continuously. The webs 8, 30 are moved by an appropriate drive means (not shown). If desired, the rollers 14, 18, 24, 34 can be driven directly so as to convey the webs 8, 30. The sheets 22 are fed continuously onto the moving self-adhesive surface 20 of the web 10 of self-adhesive paper. Thus, the sealed labels can be produced continuously until the supply of the webs 8, 30 or of the sheets 22 run out.

Figure 2:
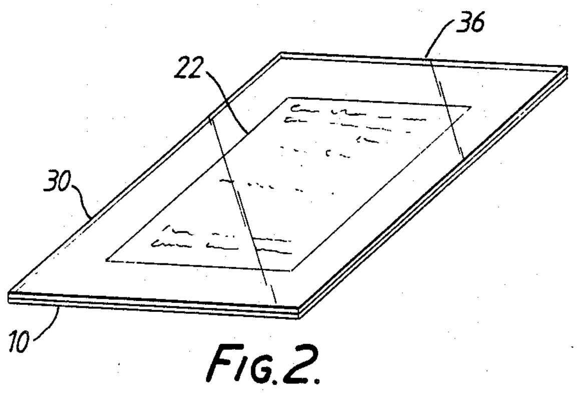
FIG. 2 shows a perspective view of a sealed label which is produced by the system of FIG. 1.

FIG. 2 shows a sealed label 36 which is made by the system of FIG. 1. The label 36 consists of a cut portion of the web of paper 10 to which is adhered a folded sheet 22. The folded sheet 22 and the exposed self-adhesive surface of the paper 10 are covered with a portion of a laminate material 30 which is transparent so that the front surface of the folded sheet is visible. In order to open the sealed label so as to unfold the folded sheet 22 and read the printed information on the concealed surfaces of the folded sheet 22, a user can either strip off the laminate material 30 from the paper 10 or cut or tear the laminate material 30.

If desired, a tear line can be provided through the laminate material 30 which extends across the adhered folded sheet 22. In order to open the sealed label 36, the tear line is torn thereby to separate the laminate material 30, and give access to the folded sheet 22 underneath. The tear line may be any appropriate length or shape. The tear line is preferably formed by the die-cutting rollers 34 at the same time as the composite web 32 is cut into a succession of sealed labels 36.

The resultant sealed label can either be adhered by its rear surface to a product to be labelled or can be packed loose inside a container for the product.

The sealed label of the invention has the advantage of being relatively inexpensive and quick to manufacture. The foldedsheet is protected from being soiled or damaged prior to use by the transparent laminate material and the paper.

What I claim is:

1. A method of producing labels consisting essentially of the steps of:

(a) providing a length of pressure-sensitive inextensible stock comprising a web of self-adhesive material which is carried on a release backing material;

(b) removing the release backing material from the web of self-adhesive material;

(c) applying a succession of individual folded sheets of printed matter having an outer peripheral edge along the length of a self-adhesive surface of the web of self-adhesive material, (d) applying a web of laminate material to the self-adhesive surface so as to cover the succession of folded sheets of printed matter adhered thereto; and (e) cutting through the adhered webs at a succession of locations along the length of the webs so as to form a plurality of individual labels, each of which includes a respective folded sheet of printed matter which is sealed between the two webs around substantially the entire peripheral edge of said folded sheet of printed matter.

2. A method according to claim 1, wherein said laminate material is transparent.

3. A method according to claim 2, wherein said transparent laminate material is made of polyester.

4. A method according to claim 2, wherein said transparent laminate material is made of acetate.

5. A method according to claim 1, wherein said laminate material is pre-printed.

6. A method according to claim 1, wherein said laminate material is opaque.

7. A method according to claim 6, wherein said laminate material is pre-printed.

* * * * *